United States Patent
Prazza (10) Patent No.: US 10,874,087 B2
(45) Date of Patent: Dec. 29, 2020

(54) ANIMAL GARMENT SYSTEM AND METHOD

(71) Applicant: Marianne Prazza, Carol Stream, IL (US)

(72) Inventor: Marianne Prazza, Carol Stream, IL (US)

(*) Notice: Subject to any disclaimer, the term of this patent is extended or adjusted under 35 U.S.C. 154(b) by 228 days.

(21) Appl. No.: 16/011,219

(22) Filed: Jun. 18, 2018

(65) Prior Publication Data

US 2018/0359996 A1 Dec. 20, 2018

Related U.S. Application Data

(60) Provisional application No. 62/522,277, filed on Jun. 20, 2017.

(51) Int. Cl.
| | | |
|---|---|---|
| *A01K 13/00* | (2006.01) | |
| *F41H 5/04* | (2006.01) | |
| *F41H 1/02* | (2006.01) | |

(52) U.S. Cl.
CPC .......... *A01K 13/007* (2013.01); *F41H 1/02* (2013.01); *F41H 5/0471* (2013.01)

(58) Field of Classification Search
CPC ..... A01K 13/00; A01K 13/006; A01K 13/007
USPC .............. 119/850, 855, 856; 54/79.1–79.4; D30/144, 145
See application file for complete search history.

(56) References Cited

U.S. PATENT DOCUMENTS

| | | | | |
|---|---|---|---|---|
| 2,222,705 A * | 11/1940 | Conlon | ............... | A01K 13/006 54/79.1 |
| 2,443,831 A * | 6/1948 | Miller | ................. | A01K 13/006 54/79.1 |
| 3,150,641 A * | 9/1964 | Kesh | .................... | A01K 13/003 119/678 |
| 3,742,679 A * | 7/1973 | Jordan | ................ | A01K 13/006 54/79.1 |
| 6,024,055 A * | 2/2000 | Jesse, Sr. | ............. | A01K 13/006 119/850 |
| 6,058,890 A * | 5/2000 | Harrell | ................ | A01K 13/006 119/850 |
| 6,223,696 B1 | 5/2001 | Murakami | | |
| 6,481,383 B1 * | 11/2002 | Ross | ................... | A01K 13/006 119/850 |
| 7,975,656 B2 * | 7/2011 | Prill | ..................... | A01K 13/006 119/850 |
| 8,707,910 B1 * | 4/2014 | Koll | ........................ | A61D 9/00 119/850 |

(Continued)

*Primary Examiner* — Richard T Price, Jr.
(74) *Attorney, Agent, or Firm* — Runyan Law; Charles Runyan (57) ABSTRACT

An animal garment system includes a body assembly, a head assembly, and a foot assembly. The body assembly includes an outer-material, an inner-material, a body-closure, and a tail-opening. The head assembly includes an exterior-material, an interior-material, a head-closure, and a plurality of ear-openings. The foot-assembly preferably includes an outside-material, an inside material, and a textured surface. The head assembly is affixed to the body assembly and the body assembly is affixed to the foot assembly. The animal garment system is intended to fit snugly about an animal and protect the animal from external conditions that may be harmful to the animal. A method of using an animal garment system is also disclosed herein.

20 Claims, 5 Drawing Sheets (56) References Cited

U.S. PATENT DOCUMENTS

| | | | |
|---|---|---|---|
| 2010/0115895 A1* | 5/2010 | Prill | A01K 13/006 54/79.2 |
| 2010/0132631 A1* | 6/2010 | Walker-Algaze | A01K 13/006 119/850 |
| 2010/0199928 A1* | 8/2010 | Matsumoto | A01K 13/006 119/850 |
| 2013/0160721 A1* | 6/2013 | Cain | A01K 29/00 119/850 |
| 2014/0053790 A1* | 2/2014 | Rumps | A01K 13/006 119/850 |
| 2014/0318478 A1* | 10/2014 | Cruz | A01K 13/006 119/850 |
| 2015/0047577 A1 | 2/2015 | Shnieder | |
| 2016/0044895 A1* | 2/2016 | Schnieder | A01K 13/006 119/850 |

* cited by examiner

ANIMAL GARMENT SYSTEM AND METHOD

CROSS-REFERENCE TO RELATED APPLICATION(S)

The present application is related to and claims priority to U.S. Provisional Patent Application No. 62/522,277 filed Jun. 20, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of animal husbandry of existing art and more specifically relates to body worn apparel for animals.

RELATED ART

Garments in general are items worn on the body. Garments can be made from textiles, synthetics, and/or sheets of various materials affixed together. Garments may be worn by humans, as well as animals—either for decoration, comfort, and/or safety. The amount and type of clothing worn can depend on body type, social, and geographic considerations. Some garments can be gender-specific.

Physically, garments serve many purposes; they may serve as protection from the elements such as cold or hot weather. Garments can protect the wearer from rough surfaces, plants, insect bites, splinters, thorns, heat, cold, hazardous condition, etc., by providing a barrier between the skin and the outside environment. Further, garments can provide a hygienic barrier, keeping infectious and toxic materials away from the body. Garments may also provide protection from ultraviolet radiation.

Most humans have pets and animals as companions or working partners (e.g., military, police, rescue, etc.). No matter the temperature of weather outdoors, pets and animals generally enjoy and/or require outside activities and exercise. In cases where the temperature is extremely warm or cold, the pads/feet/hooves of the pet may become injured with contact with extremely hot or cold ground surfaces. Also, rough terrain may damage the animal's feet. Further, animals that are working partners may experience dangerous conditions. Therefore, a need exists for a protective garment for animals from certain conditions.

U.S. Pub. No. 2014/0318478 to Enrique Cruz relates to a protective animal garment. The described protective animal garment includes a body, legs and integral boots. The legs may include openings covered by flaps. The openings provide access to the interior of the garment so that a person may properly position an animal's foot or paw within integral boots. The garment may include a lining for comfort and patches of durable material. The integral boots may also include durable soles.

SUMMARY OF THE INVENTION

In view of the foregoing disadvantages inherent in the known body worn apparel for animals art, the present disclosure provides a novel protective clothing system for pets useful in inclement weather or other conditions. The general purpose of the present disclosure, which will be described subsequently in greater detail, is to provide an effective and efficient animal garment system.

An animal garment system is disclosed herein. The animal garment system includes a body assembly, a head assembly, and a foot assembly. The body assembly preferably includes an outer-material, an inner-material, a body-closure, and a tail-opening configured to allow a tail to protrude from the body assembly. The body assembly also includes a rear-opening; the rear-opening configured to allow an animal to defecate external through and from the animal garment system. Similarly, the body assembly preferably includes a lower-opening configured to allow the animal to urinate external through and from the animal garment system, with the body assembly configured to snugly fit a body of an animal.

The head assembly preferably includes an exterior-material, an interior-material, a head-closure, and a plurality of ear-openings; the ear-openings configured to allow the ears of the animal to protrude from the animal garment system; with the head assembly configured to snugly fit a head of the animal.

The outer-material of the body assembly and the exterior-material of the head assembly are each preferably constructed from a substantially waterproof material. The inner-material of the body assembly and the interior-material of the head assembly are each preferably constructed from a thermally insulated material configured to retain body heat from the animal in low temperature conditions.

The foot-assembly preferably includes an outside-material, an inside material, and a textured surface, with the foot assembly configured to snugly fit a plurality of feet of the animal.

Preferably, the head assembly is affixed to the body assembly, and similarly, the body assembly is affixed to the foot assembly. The animal garment system is configured to protect the animal from external conditions. Also, the body-closure head-closure each is preferably linearly and mechanically connected (e.g., a continuous fastener, etc.).

The outer-material of the body assembly and the exterior-material of the head assembly are preferably constructed from a textile material. The body-closure and the head-closure include a continuous closing clasp-locker fastener (e.g., Zipper®).

According to another embodiment, a method of using an animal garment system is also disclosed herein. The method of using an animal garment system includes a first step, providing an animal; a second step, providing an animal garment system; a third step, placing the animal garment system upon the animal; a fourth step, closing a body-closure and a head-closure of the animal garment system upon the animal; a fifth step, opening the head-closure and the body-closure; and a sixth step, removing the animal garment system from the animal after use.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an animal garment system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to body worn apparel for animals and more particularly to an animal garment system as used to improve protection of animals against adverse weather and other conditions.

Generally, an animal garment system may be a suit-like device with boots attached to the body material. The animal garment system may include insulation material on the inside and a vinyl exterior; other materials may include bulletproof exterior and/or textiles. The device may be placed upon the animal and include a closure. The system is intended to be specific to the size of the breed and/or type of animal. Also, the device may include a decorative or functional (e.g., camouflage for military, etc.) exterior appearance.

Referring now more specifically to the drawings by numerals of reference, there is shown in FIGS. 1-4, various views of animal garment system 100.

Figure 1:
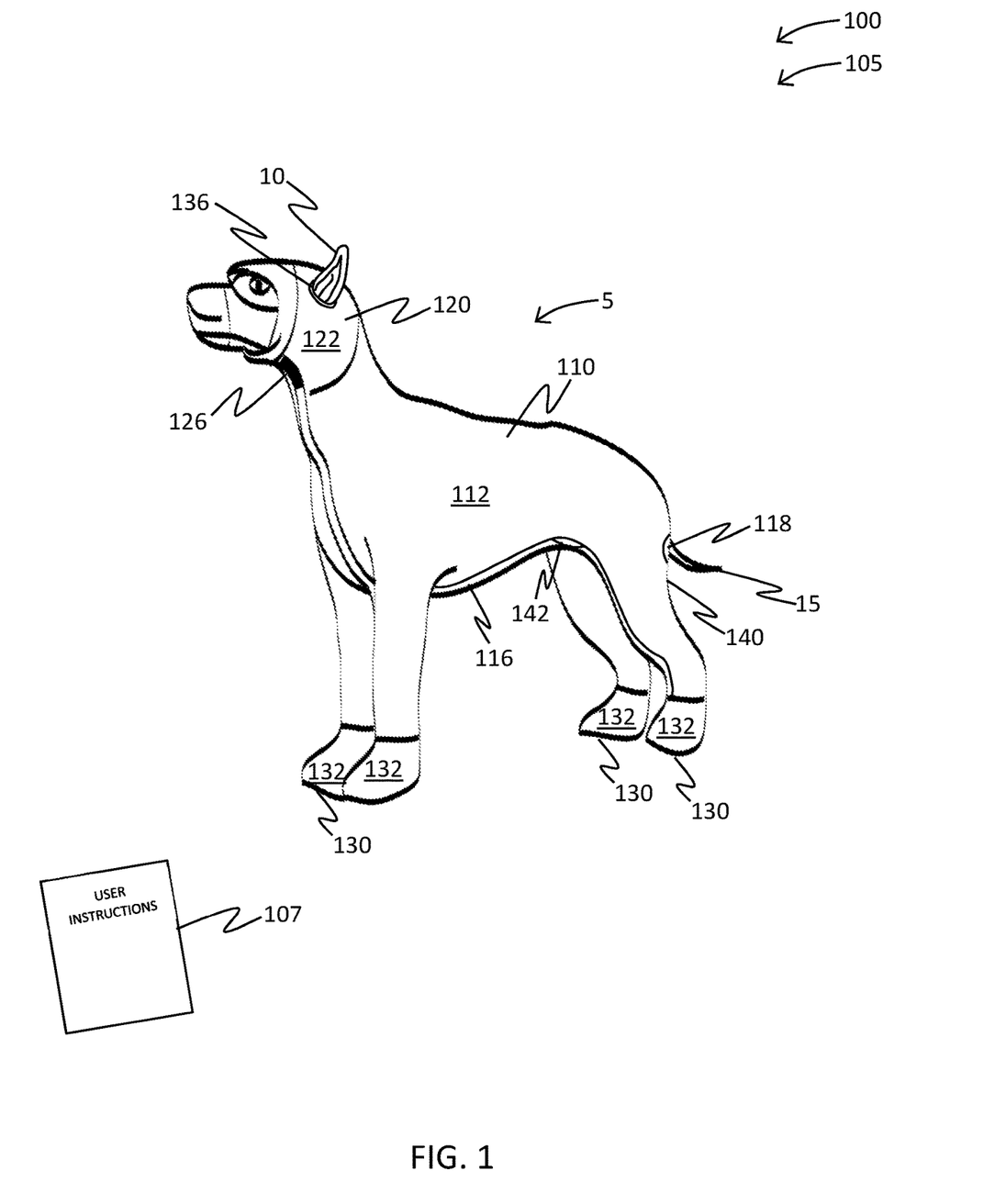
FIG. 1 is a perspective view of the animal garment system during an 'in-use' condition, according to an embodiment of the disclosure.
Figure 2:
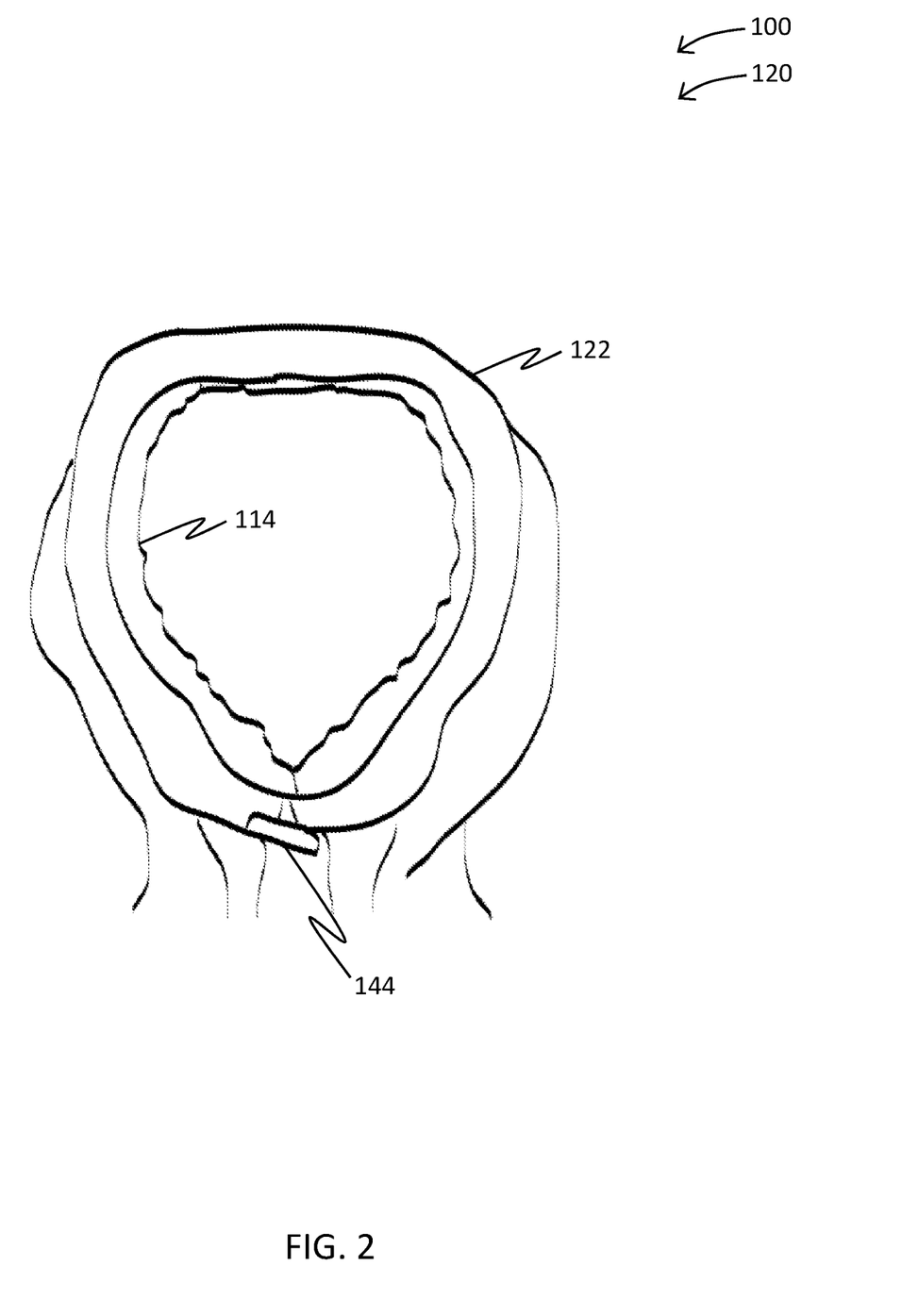
FIG. 2 is a front perspective view of the head assembly of the animal garment system of FIG. 1, according to an embodiment of the present disclosure.

FIG. 1 shows animal garment system 100 during an 'in-use' condition, according to an embodiment of the present disclosure. Here, animal garment system 100 may be beneficial for use by a user to provide exterior protection to animal 5 from weather and/or other hazards. As illustrated, animal garment system 100 may include body assembly 110, head assembly 120, and foot assembly 130.

As shown in FIGS. 1-4, body assembly 110 may include outer-material 112, inner-material 114, body-closure 116, and tail-opening 118, with body assembly 110 configured to snugly fit a body of animal 5. In embodiments, head assembly 120 may affixed to body assembly 110, and foot assembly 130 may be affixed to body assembly 110. Animal garment system may be configured to protect animal 5 from external conditions. Body-assembly 110 may further include rear-opening 140 configured to allow animal 5 to defecate external through and from animal garment system 100. Body-assembly 110 may further include lower-opening 142 configured to allow animal 5 to urinate external through and from animal garment system 100. Those with ordinary skill in the art will now appreciate that upon reading this specification and by their understanding the art of animal husbandry as described herein, methods of use and manufacturing techniques, design orientations (e.g., male vs. female animals) will be understood by those knowledgeable in such art.

As shown, head assembly 120 may include exterior-material 122, interior-material 124, and head-closure 126, with head assembly 120 configured to snugly fit a head of animal 5. Head assembly 120 may further include a plurality of ear-openings 136 configured to allow ears 10 of animal to protrude from animal garment system 100. Head assembly 120 may further include secondary-closure 144 configured on the underside of a neck of animal 5.

In embodiments, outer-material 112 of body assembly 110 and exterior-material 122 of head assembly 120 may be constructed from a waterproof material. Also, outer-material 112 of body assembly 110 and exterior-material 122 of head assembly 120 may be constructed from a bulletproof material; embodiments may include flame retardant material, stab-proof/bite-proof material or other protective materials. Also, embodiments may include inner-material 114 of body assembly 110, and interior-material 124 of head assembly 120 constructed from a thermally insulated material configured to retain body heat from animal 5 in low temperature conditions.

Outer-material 112 of body assembly 110 and exterior-material 122 of head assembly 120 may be constructed from a textile material, in embodiments. Outer-material 112 of body assembly 110 and exterior-material 122 of head assembly 120 may be constructed from a vinyl material, as to be durable and waterproof. Also, inner-material 114 of body assembly 110 and interior-material 124 of head assembly 120 may be constructed from natural fur materials (e.g., materials rendered from an animal). Other materials may be used, depending upon user preferences and specific use conditions.

Figure 3:
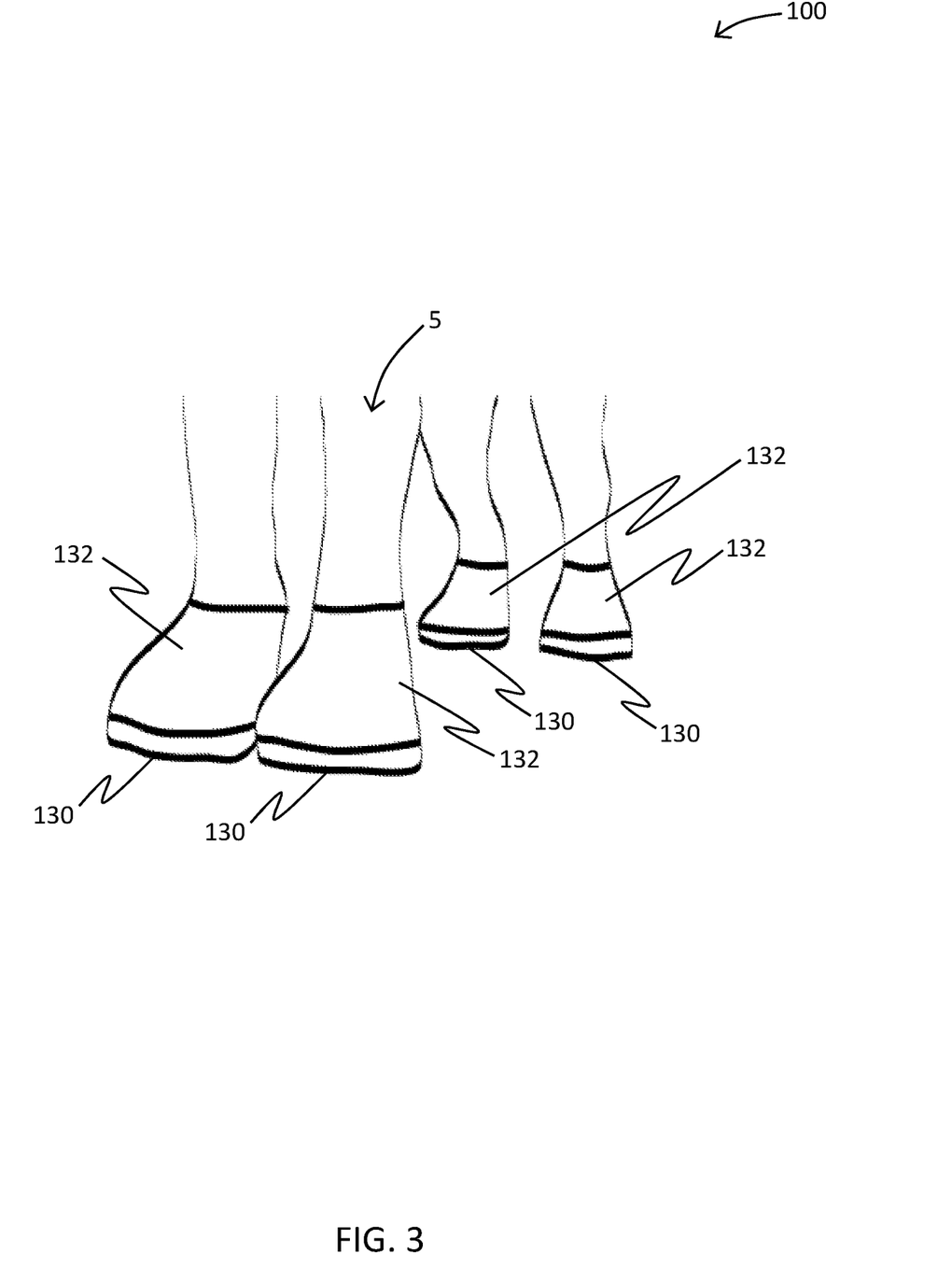
FIG. 3 is a front perspective view of the foot assembly of the animal garment system of FIG. 1, according to an embodiment of the present disclosure.
Figure 4:
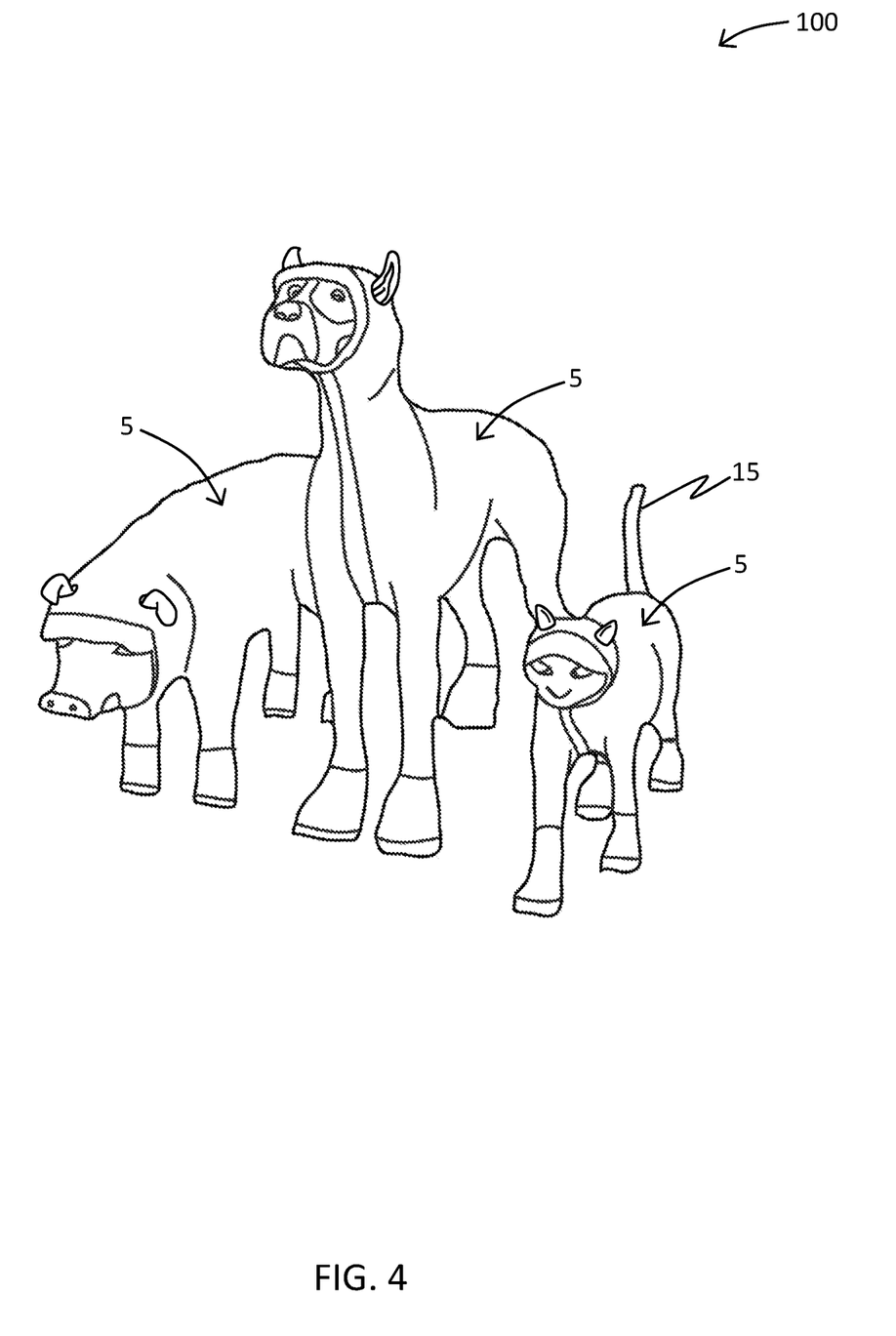
FIG. 4 is a perspective view of the animal garment system of FIG. 1, according to embodiments of the present disclosure.

Foot-assembly 130 may include outside-material 132, inside material 134, with foot assembly 130 configured to snugly fit a plurality of feet of animal 5. Foot assembly 130 may be removably affixed to body assembly 110, in some embodiments. Foot assembly 130 may include a textured surface configured to provide increased traction during use.

In some embodiments, body-closure 116 and head-closure 126 may include a hook-and-loop fastener. Similarly, body-closure 116 and head-closure 126 may include a continuous closing clasp-locker fastener. Embodiments may include a combination of hook-and-loop, claps-locker, or other suitable fasteners. Body-closure 116 and head-closure 126 may be linearly and mechanically connected, in embodiments. Embodiments may include animal garment system which may be washable.

According to one embodiment, animal garment system 100 may be arranged as a kit 105. In particular, animal garment system 100 may further include a set of instructions 107. The instructions 107 may detail functional relationships in relation to the structure of animal garment system 100 such that animal garment system 100 can be used, maintained, or the like, in a preferred manner.

Figure 5:
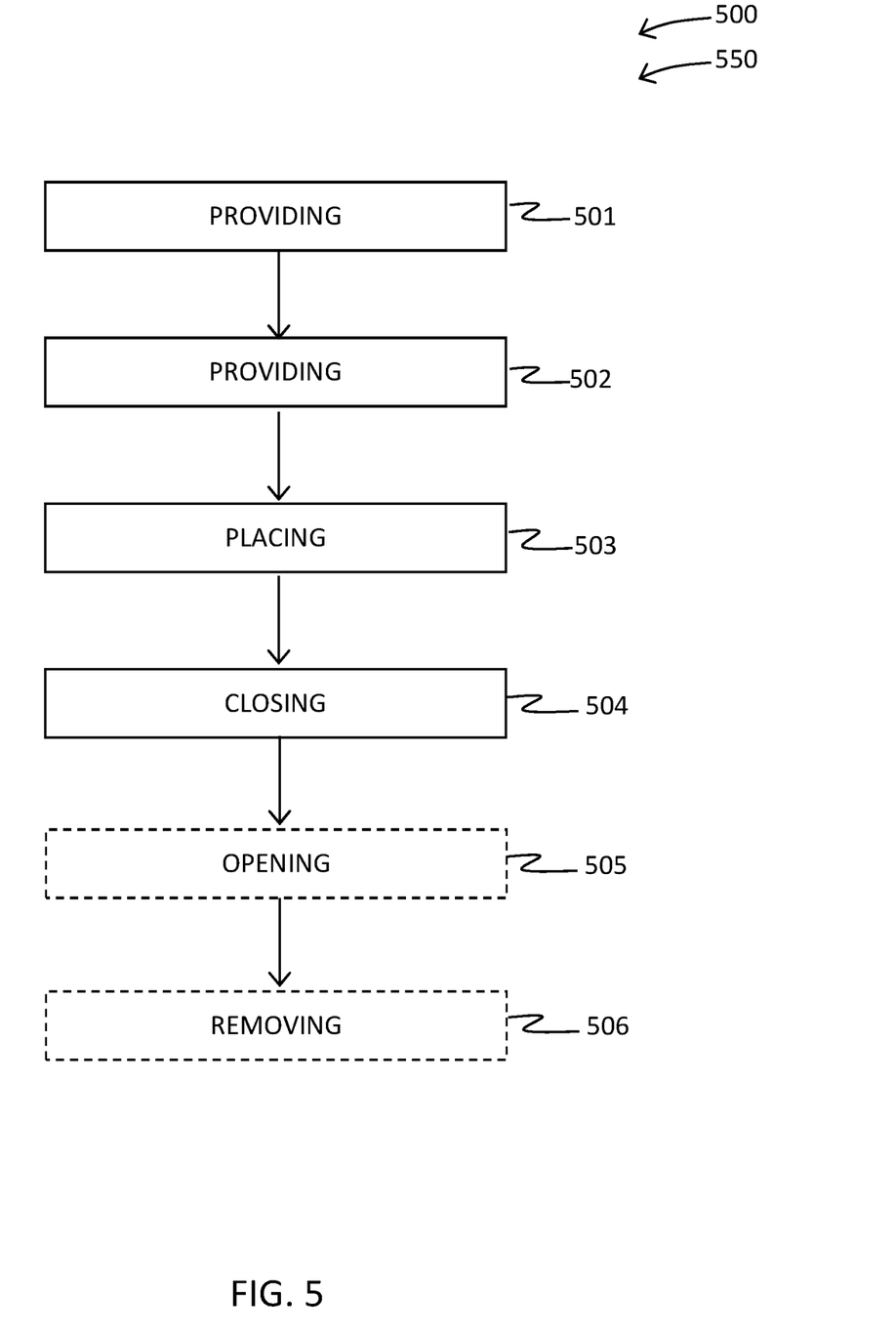
FIG. 5 is a flow diagram illustrating a method of using an animal garment system, according to an embodiment of the present disclosure.

FIG. 5 is a flow diagram illustrating method of using an animal garment system 500, according to an embodiment of the present disclosure. In particular, method of using an animal garment system 500 may include one or more components or features of animal garment system 100 as described above. As illustrated, method of using an animal garment system 500 may include the steps of: step one 501, providing an animal; step two 502, providing animal garment system 100; step three 503, placing animal garment system 100 upon animal 5; step four 504, closing body-closure 116 and head-closure 126 upon animal 5; step five 505, opening head-closure 126 and body-closure 116; and step six 506, removing animal garment system 100 from animal 5.

It should be noted that step five 505 and step six 506 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference.

The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other method of using an animal garment system, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An animal garment system, said system comprising:
   a body assembly, said body assembly including an outer-material, an inner-material, a body-closure, and a tail-opening, with said body assembly configured to snugly fit a body of an animal;
   a head assembly, said head assembly including an exterior-material, an interior-material, and a head-closure, with said head assembly configured to snugly fit a head of said animal;
   a foot assembly, said foot-assembly including an outside-material, an inside material, with said foot assembly configured to snugly fit a plurality of feet of said animal;
   wherein said head assembly is affixed to said body assembly;
   wherein said foot assembly is affixed to said foot assembly; and
   wherein said animal garment system is configured to protect said animal from external conditions.

2. The animal garment system of claim 1, wherein said head assembly further includes a plurality of ear-openings configured to allow ears of said animal to protrude from said animal garment system.

3. The animal garment system of claim 1, wherein said body-assembly further includes a rear-opening configured to allow said animal to defecate external through and from said animal garment system.

4. The animal garment system of claim 1, wherein said body-assembly further includes a lower-opening configured to allow said animal to urinate external through and from said animal garment system.

5. The animal garment system of claim 1, wherein said outer-material of said body assembly, and said exterior-material of said head assembly are constructed from a waterproof material.

6. The animal garment system of claim 1, wherein said wherein said outer-material of said body assembly, and said exterior-material of said head assembly are constructed from a bulletproof material.

7. The animal garment system of claim 1, wherein said wherein said inner-material of said body assembly, and said interior-material of said head assembly are constructed from a thermally insulated material configured to retain body heat from said animal in low temperature conditions.

8. The animal garment system of claim 1, wherein said foot assembly is removably affixed to said body assembly.

9. The animal garment system of claim 1, wherein said wherein said foot assembly includes a textured surface configured to provide increased traction during use.

10. The animal garment system of claim 1, wherein said outer-material of said body assembly and said exterior-material of said head assembly are constructed from a textile material.

11. The animal garment system of claim 1, wherein said outer-material of said body assembly and said exterior-material of said head assembly are constructed from a vinyl material.

12. The animal garment system of claim 1, wherein said wherein said inner-material of said body assembly and said interior-material of said head assembly are constructed from a natural fur material.

13. The animal garment system of claim 1, wherein said body-closure and said head-closure include a hook-and-loop fastener.

14. The animal garment system of claim 1, wherein said wherein said body-closure and said head-closure include a continuous closing clasp-locker fastener.

15. The animal garment system of claim 1, wherein said body-closure and said head-closure are linearly and mechanically connected.

16. The animal garment system of claim 1, wherein said head assembly includes a secondary-closure configured on the underside of a neck of said animal.

17. An animal garment system, said system comprising:
   a body assembly, said body assembly including an outer-material, an inner-material, a body-closure, a tail-opening configured to allow a tail to protrude from said body assembly, a rear-opening configured to allow an animal to defecate external through and from said animal garment system, and a lower-opening configured to allow said animal to urinate external through and from said animal garment system, with said body assembly configured to snugly fit a body of an animal;
   a head assembly, said head assembly including an exterior-material, an interior-material, a head-closure, and a plurality of ear-openings configured to allow ears of said animal to protrude from said animal garment system, with said head assembly configured to snugly fit a head of said animal;
   a foot assembly, said foot-assembly including an outside-material, an inside material, and a textured surface, with said foot assembly configured to snugly fit a plurality of feet of said animal;

wherein said head assembly is affixed to said body assembly;

wherein said foot assembly is affixed to said foot assembly;

wherein said animal garment system is configured to protect said animal from external conditions;

wherein said outer-material of said body assembly, and said exterior-material of said head assembly are constructed from a waterproof material;

wherein said inner-material of said body assembly, and said interior-material of said head assembly are constructed from a thermally insulated material configured to retain body heat from said animal in low temperature conditions;

wherein said outer-material of said body assembly and said exterior-material of said head assembly are constructed from a textile material;

wherein said wherein said body-closure and said head-closure include a continuous closing clasp-locker fastener; and wherein said body-closure and said head-closure are linearly and mechanically connected.

18. The animal garment system of claim 17, further comprising set of instructions; and wherein said animal garment system is arranged as a kit.

19. A method of using an animal garment system, the method comprising the steps of:

providing an animal;

providing an animal garment system;

placing said animal garment system upon said animal; and closing a body-closure and a head-closure upon said animal.

20. The method of claim 19, further comprising the steps of:

opening said head-closure and said body-closure; and removing said animal garment system from said animal.

* * * * *